Jan. 7, 1936.  A. K. H. GERMUNDSSON  2,026,882
AUTOMATIC CALENDAR
Filed July 7, 1934    12 Sheets-Sheet 1

A. K. H. GERMUNDSSON
INVENTOR
by his ATTORNEY.

Jan. 7, 1936.  A. K. H. GERMUNDSSON  2,026,882
AUTOMATIC CALENDAR
Filed July 7, 1934    12 Sheets-Sheet 2
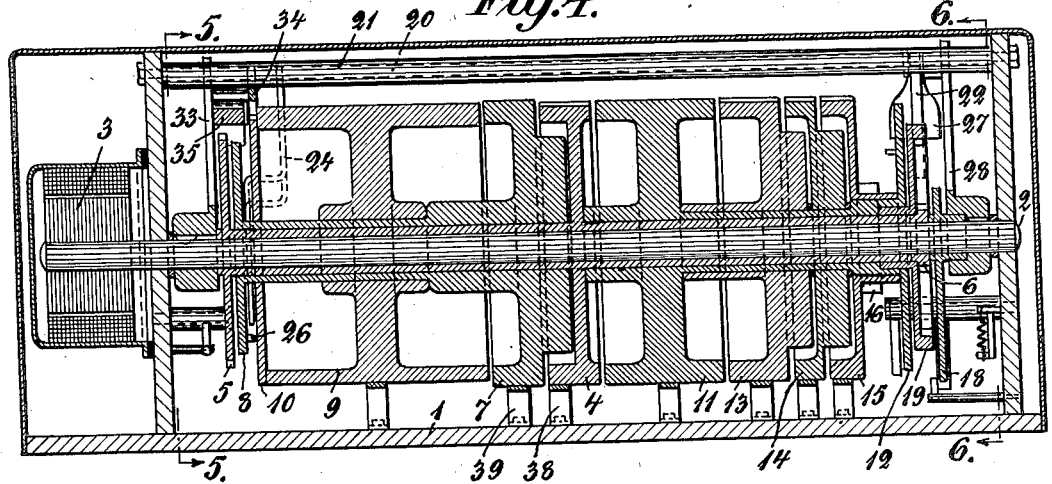
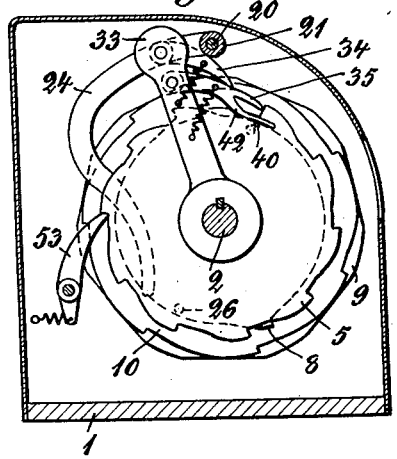
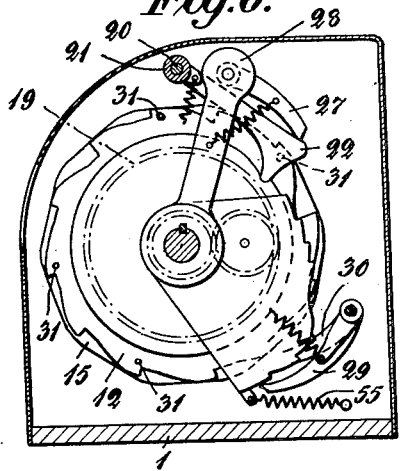
A. K. H. GERMUNDSSON
INVENTOR
by S. A. Oppenheimer
his ATTORNEY

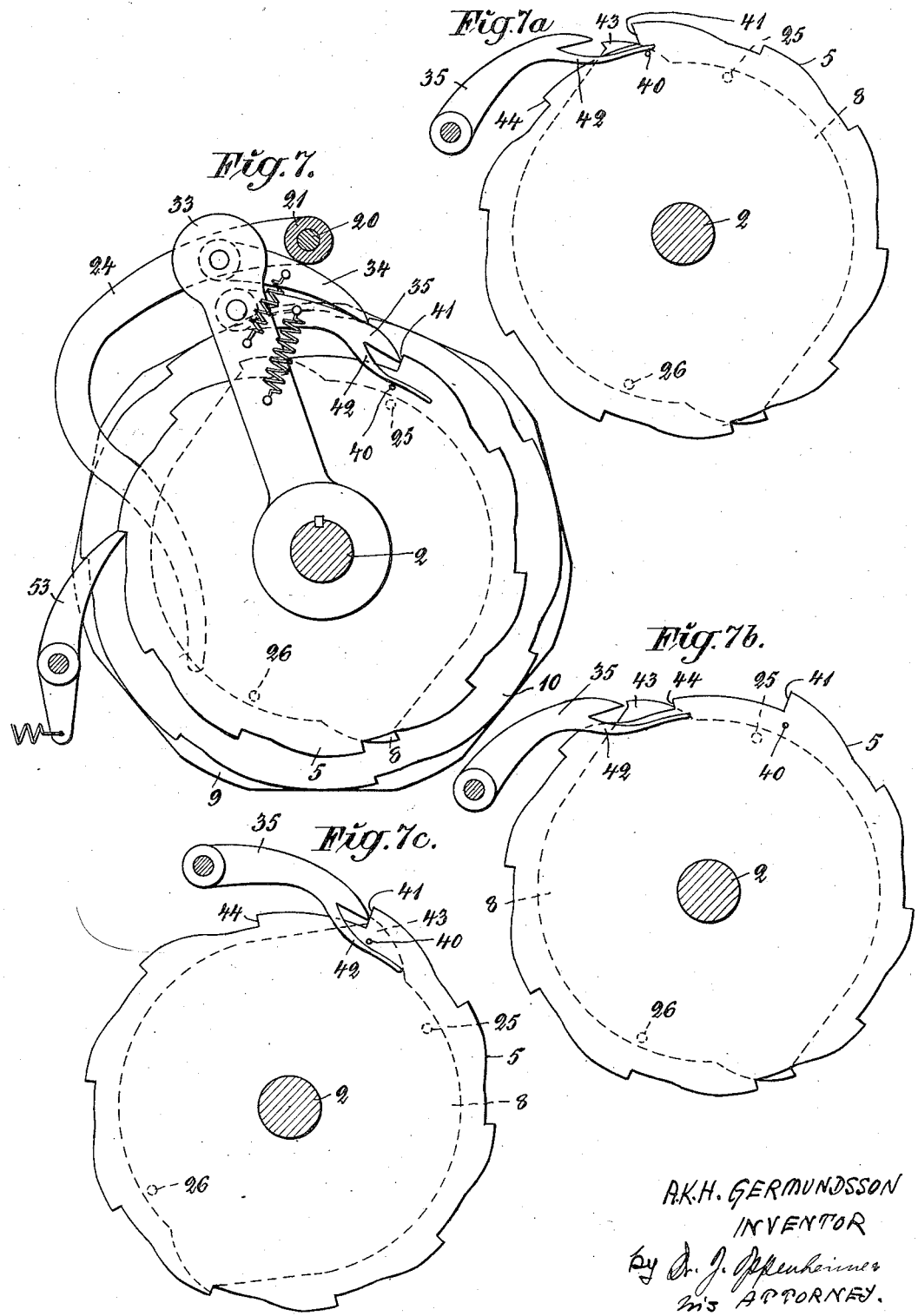

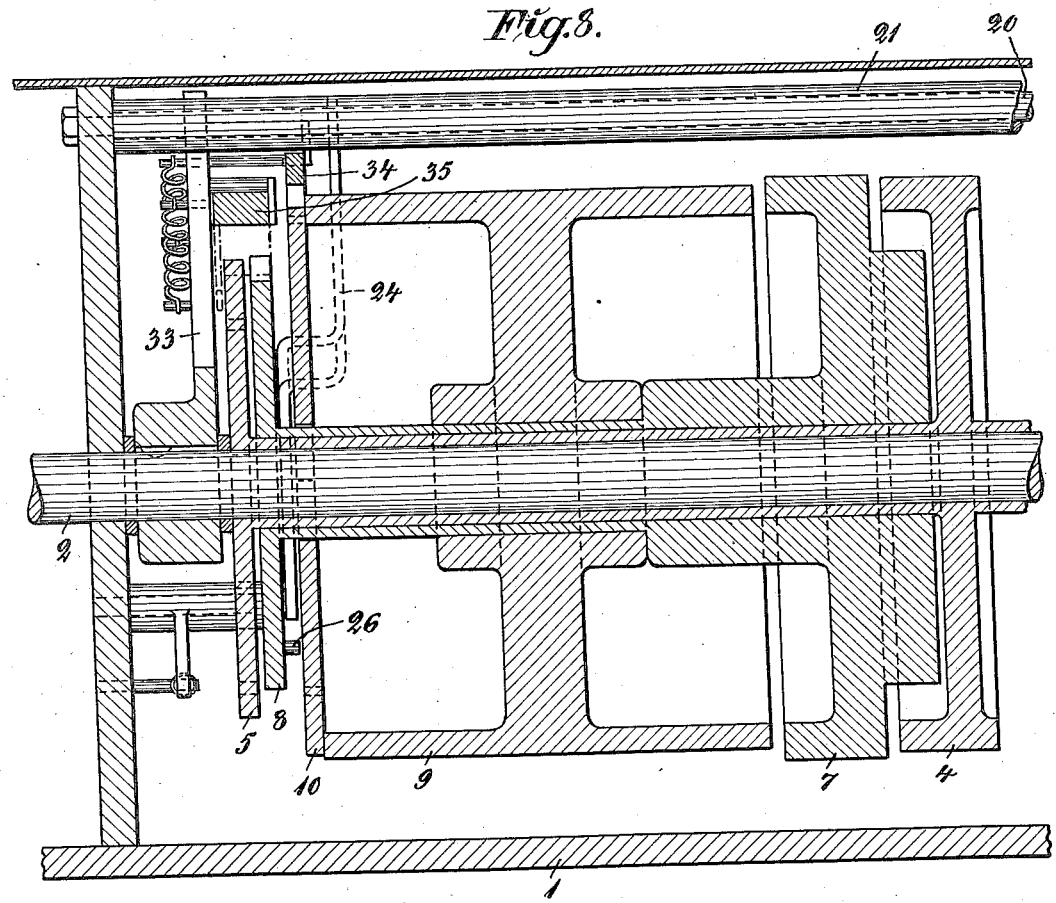

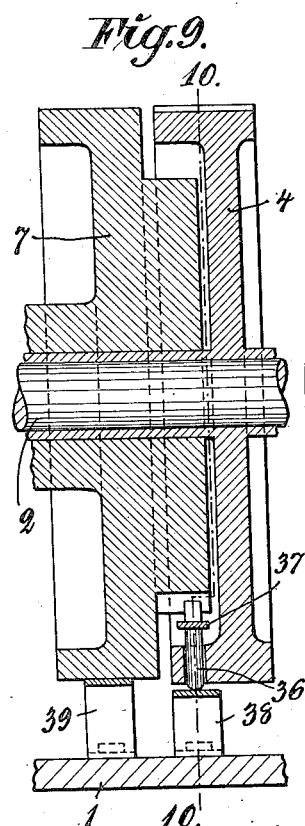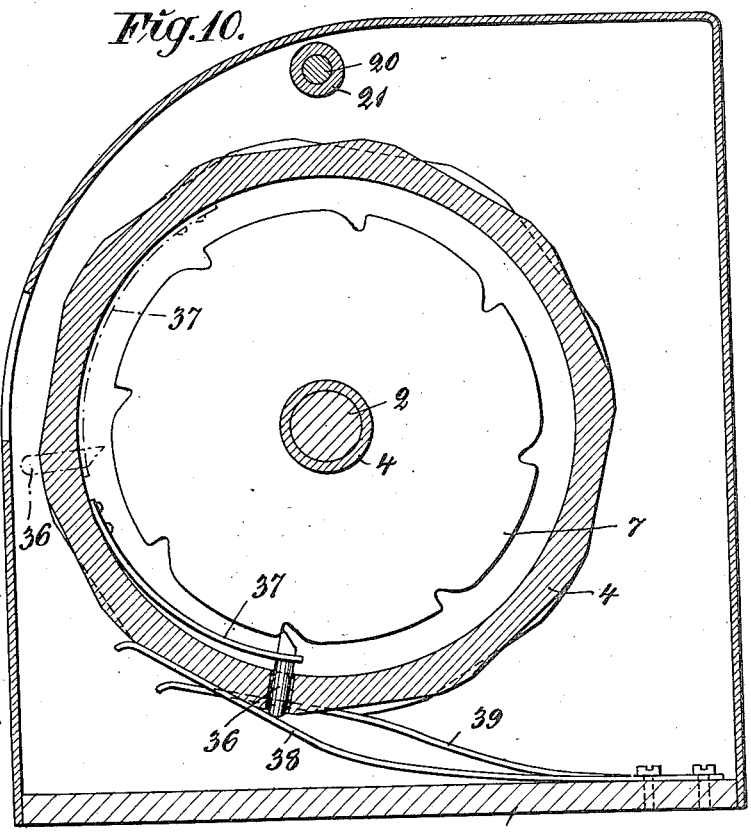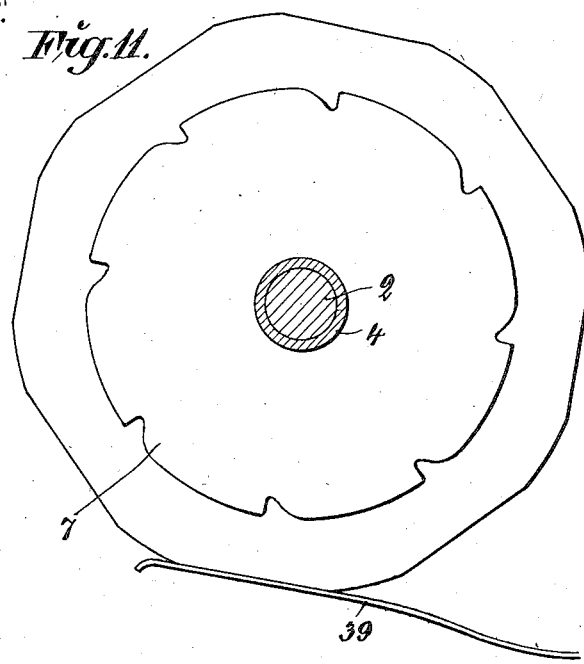

Jan. 7, 1936.  A. K. H. GERMUNDSSON  2,026,882
AUTOMATIC CALENDAR
Filed July 7, 1934   12 Sheets-Sheet 6

A. K. H. GERMUNDSSON
INVENTOR
his ATTORNEY

Jan. 7, 1936.  A. K. H. GERMUNDSSON  2,026,882
AUTOMATIC CALENDAR
Filed July 7, 1934  12 Sheets-Sheet 7

A. K. H. GERMUNDSSON
INVENTOR
By Dr. J. Oppenheimer
his ATTORNEY.

A. K. H. GERMUNDSSON
INVENTOR
By Dr. J. Oppenheimer
his ATTORNEY.

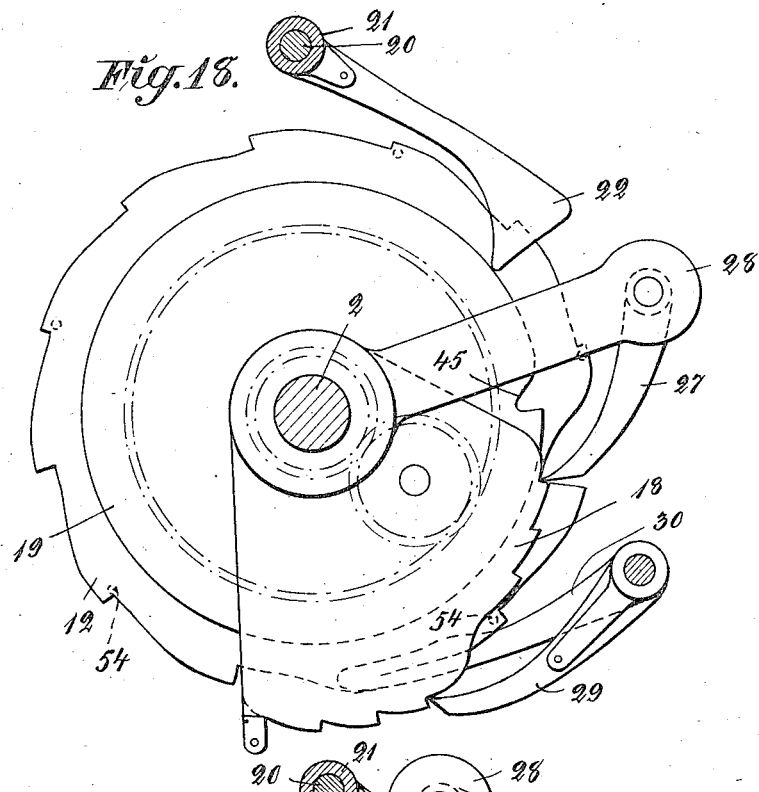
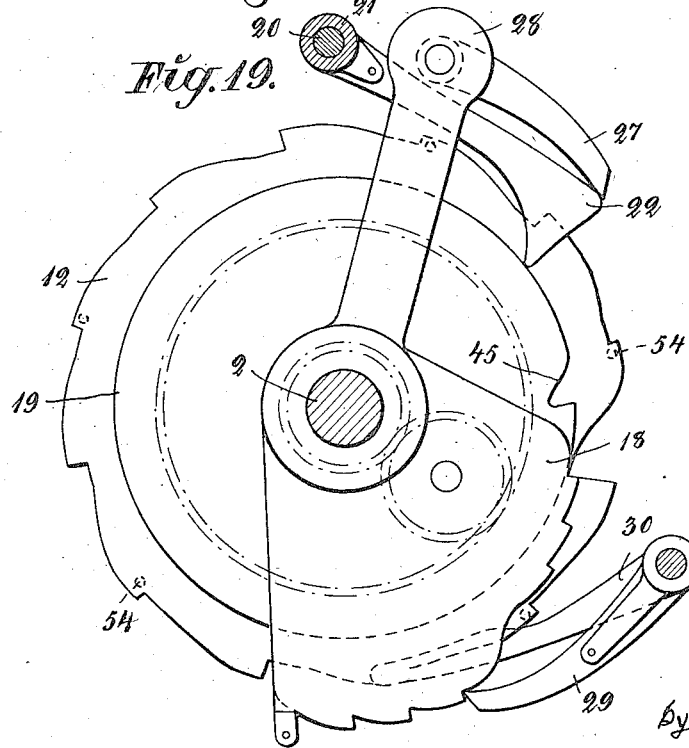

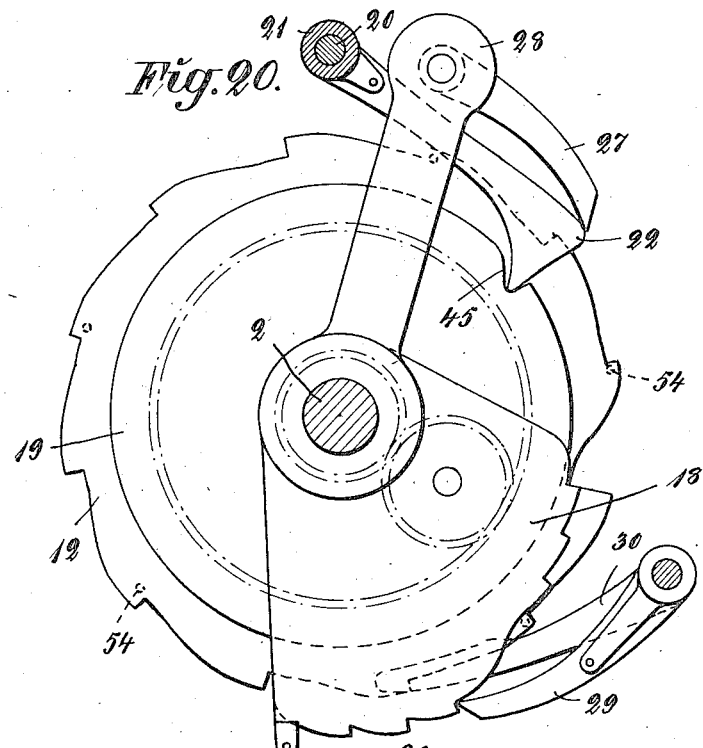
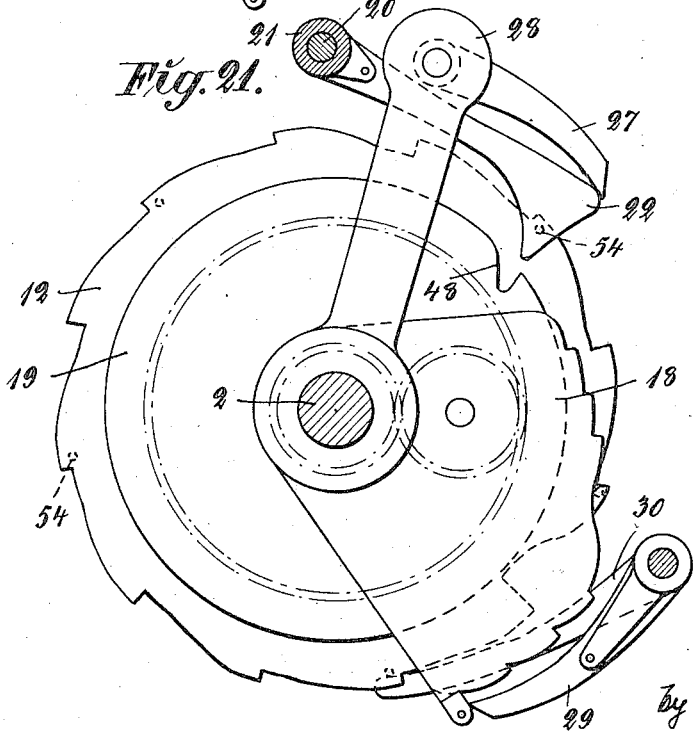

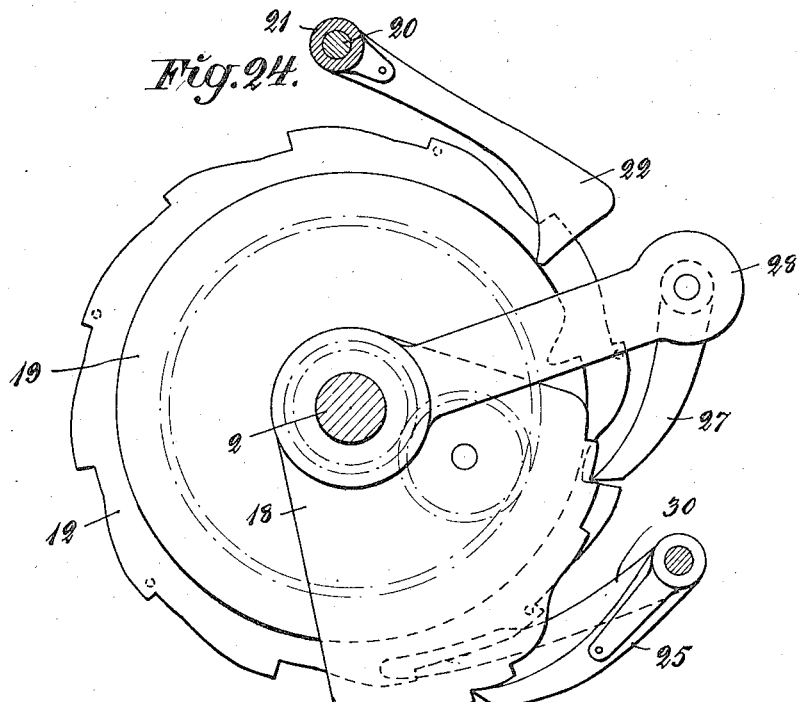
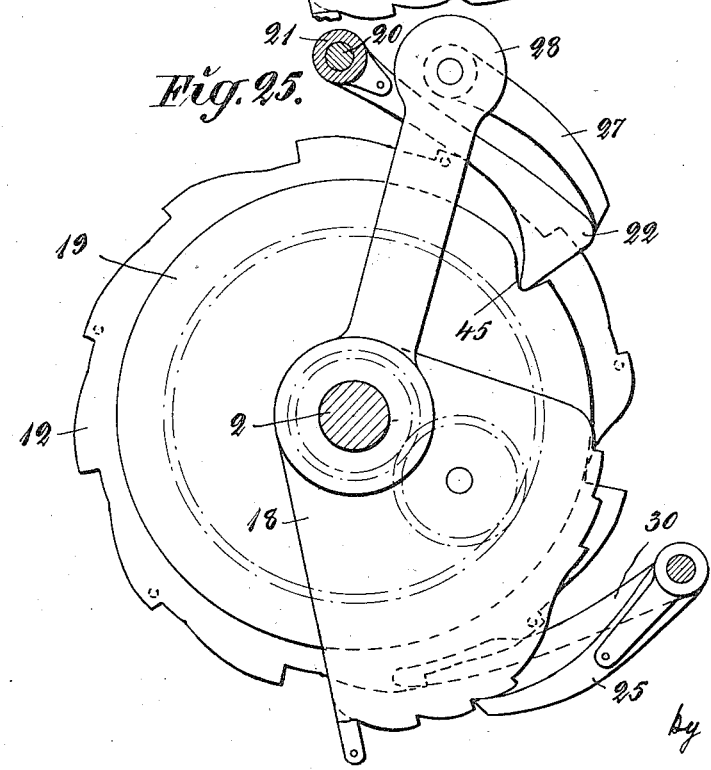

Patented Jan. 7, 1936

2,026,882

UNITED STATES PATENT OFFICE 2,026,882

AUTOMATIC CALENDAR

Agne Knös Herbert Germundsson, Stockholm, Sweden

Application July 7, 1934, Serial No. 734,111
In Sweden July 15, 1933

7 Claims. (Cl. 40—112)

The present invention relates to an automatic calendar in which indicators having marked thereon the names of the days of the week, the date figure or figures, the month names, and figures giving the number of the year are advanced by a clockwork under the influence of periodical external impulses, and has for its object to provide an improved driving mechanism for such apparatus. With this object in view there is according to the invention included between the driving mechanism for the date figure indicators and the driving mechanism for the month name indicator an arrangement adapting the calendar to indicate correctly the different lengths of the months, said arrangement consisting of a differential mechanism which at the beginning of each month adjusts the mechanism for shifting the name of the month to operate as many days earlier as the month has a number of days less than 31 and which at the end of each such short month, on completion of the shifting operation, again adds as many days so that the date indicators always pass the position 31 before the date numeral 1 of the next month appears.

Referring to the drawings showing an embodiment of the invention:

Figure 4 is a horizontal sectional view of the calendar.

Figures 5 and 6 are cross sectional views taken on the lines 5—5 and 6—6 in Figure 4 which views show the arrangement of the ratchet wheels and the radial arms forming parts of the calendar mechanism.

Figure 1:
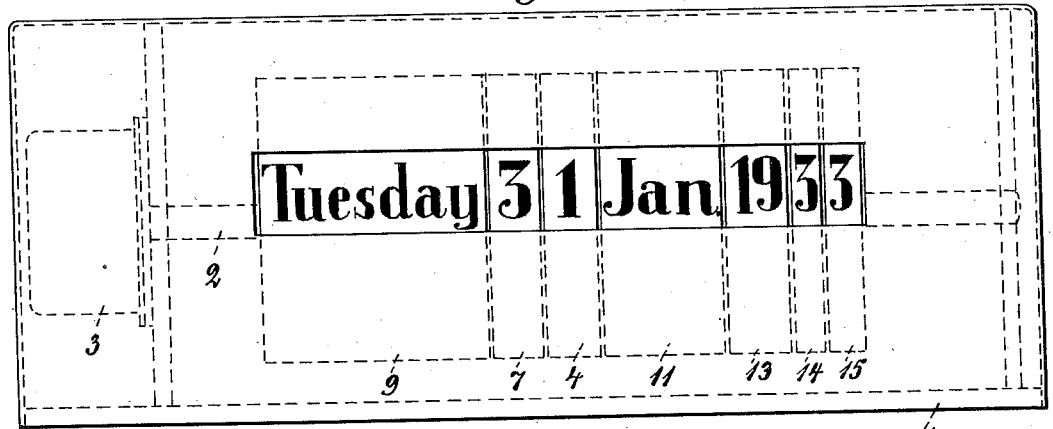
Figure 1 is a front view of the calendar.
Figure 3:
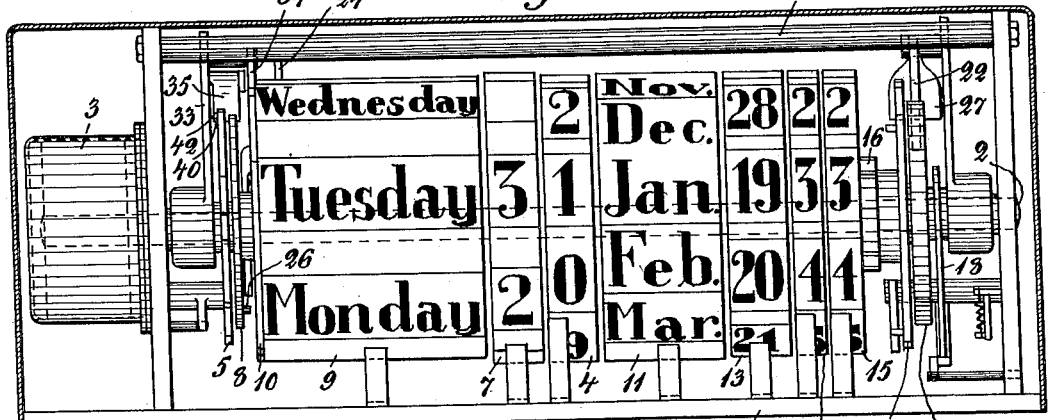
Figure 3 is a front view of the calendar with the casing removed.
Figure 2:
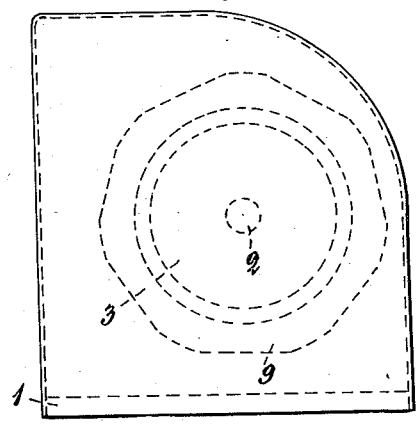
Figure 2 is a side elevation thereof looking from the left in Figure 1.

Figures 7 and 8 are an end view and a longitudinal cross sectional view of the mechanism at the left hand end of the cylinder of indicator drums as viewed in Figure 3.

Figures 7a, 7b, and 7c are diagrams showing the same mechanism in different positions.

Figure 9 is a vertical sectional view of the date indicator drums with the appertaining tens transfer mechanism. Figure 10 is a cross sectional view taken on the line 10—10 in Figure 9. Figure 11 shows the drum indicating the tens digits of the date with its appertaining ratchet wheel. In order to show more clearly the tens transfer mechanism the parts in Figures 9 to 11 are not set for the same date as in Figures 1 to 6.

Figure 12:
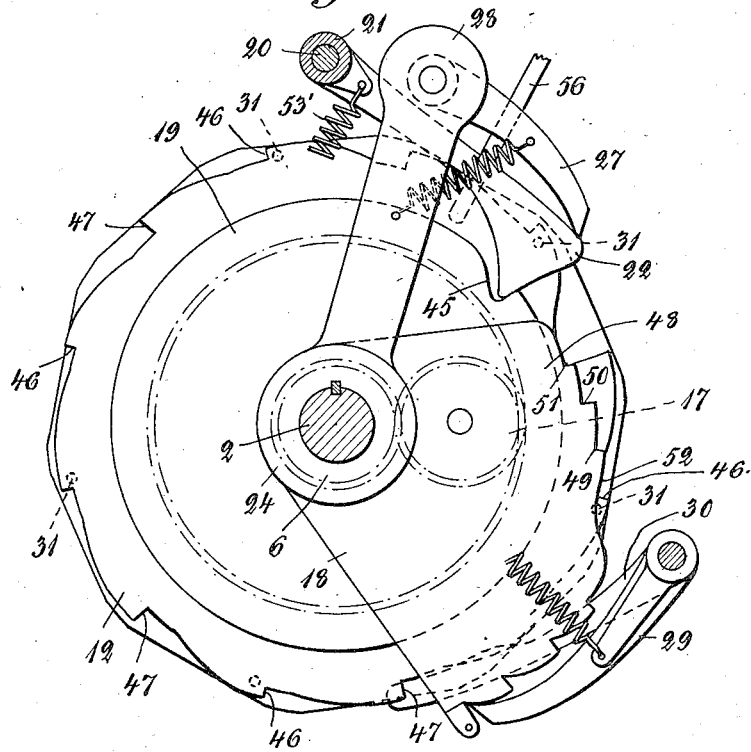
Figure 14:
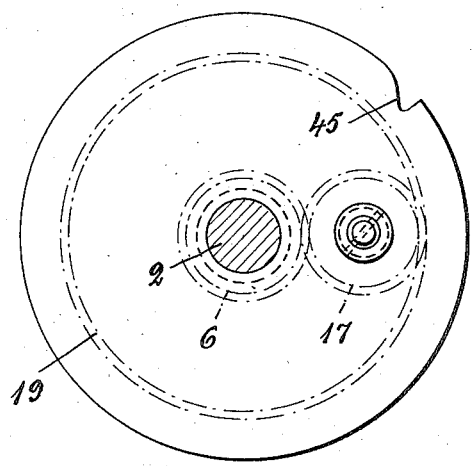
Figure 16:
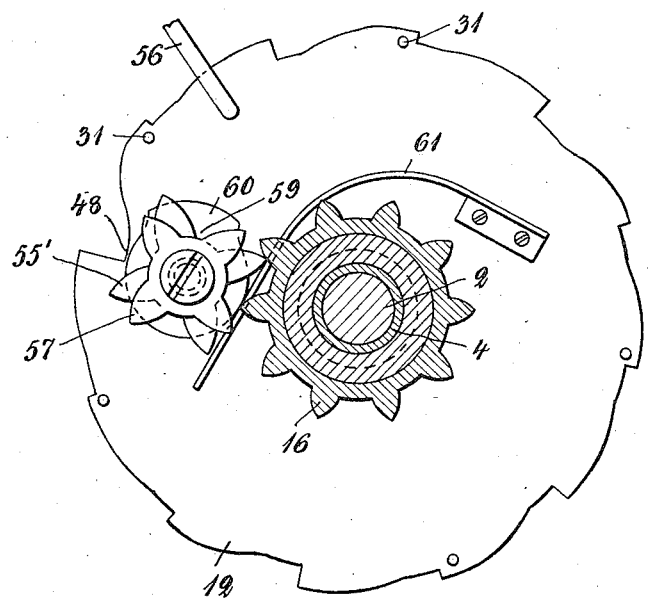

Figures 12, 14 and 16 are end views of parts of the mechanism at the right hand end of the indicator drum cylinder, Figures 12 and 14 showing the parts looking from the right in Figure 4, Figure 16 looking from the left in Figure 4.

Figure 13:
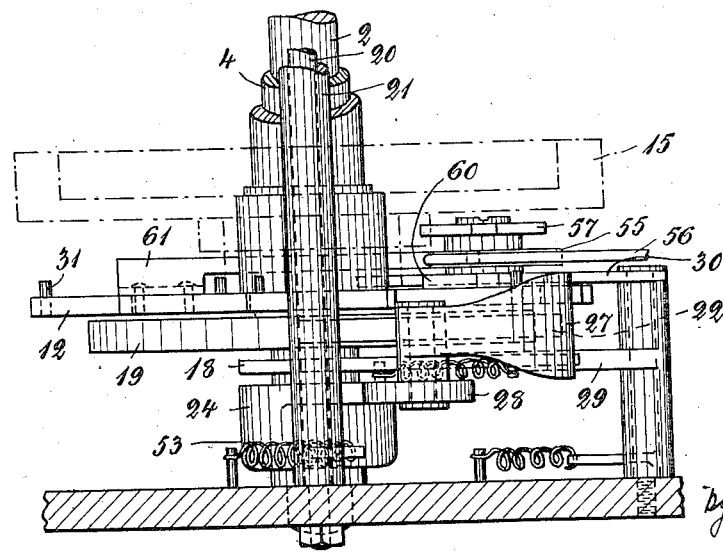
Figure 15:
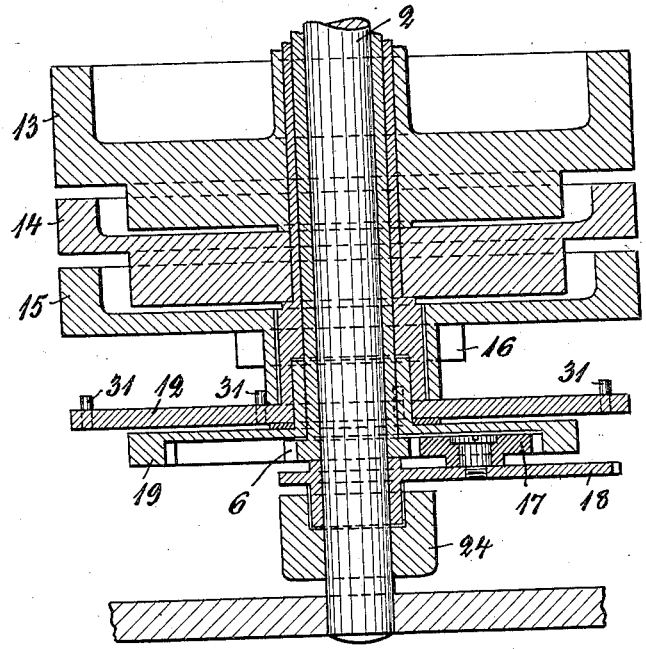
Figure 17:
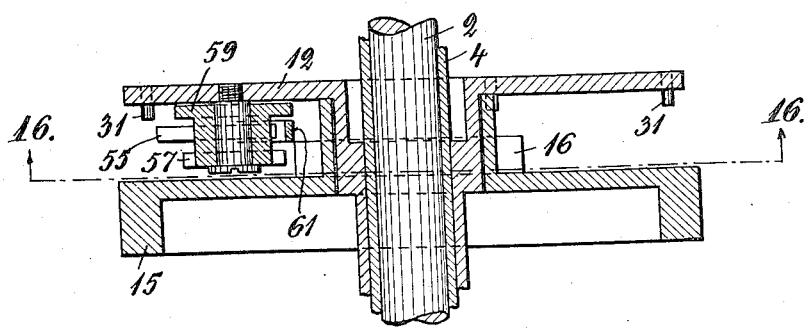
Figure 22:
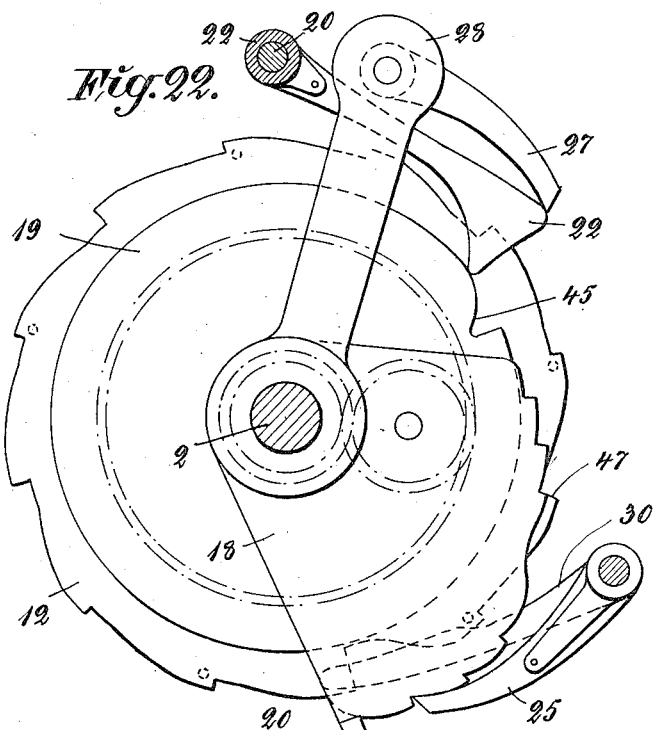
Figure 23:
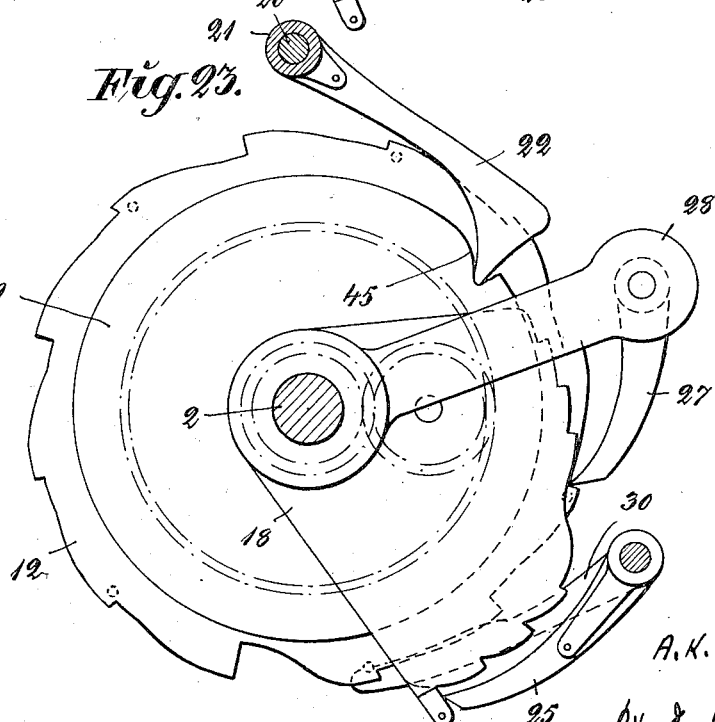

Figures 13, 15 and 17 are horizontal sectional views of the same parts.

Figures 18 to 25 are diagrams of the mechanism for equalizing the different lengths of the months.

The indicator drums and the mechanism for driving same are arranged within a casing (Figure 1) provided with an aperture through which the positions of the indicator drums may be observed. In a frame 1 (Figures 3 to 6) is journalled a longitudinal spindle 2 on which all drums and ratchet wheels are in turn journalled. Onto the left hand end of the spindle, as viewed in Figure 4, is keyed the rotor 3 of a turning magnet which is adapted to receive electrical impulses from an external current source, in some cases from a central source common to a plurality of calendars, and which is adapted for each such impulse to turn the shaft 2 one seventh of a complete revolution (counter-clockwise according to Figure 5, clockwise according to Figure 6). Nearest to the spindle is journalled the drum indicating the unit numbers of the date, viz. the date unit drum 4, the hub of which is shaped to form a sleeve surrounding the spindle and extending along the whole indicator drum cylinder both to the left and to the right as viewed in Figure 4. To the left of the indicator drum cylinder there is keyed onto this sleeve a ratchet wheel 5 (Figures 5, 7 and 8) and to the right of said cylinder there is keyed to the same sleeve the sun wheel 6 (Figures 12, 14 and 15) of a planetary gear. On the sleeve of the drum 4 is journalled a sleeve connecting the drum indicating the ten numbers of the date, viz. the date tens drum 7 (Figures 4, 8 and 9), with the ratchet wheel 8 positioned to the left of the indicator drum cylinder (Figures 4, 7 and 8). On the sleeve of the drum 7 is journalled the day name drum 9 (Figures 4 and 8) the left end surface of which is shaped to form a ratchet wheel 10 (Figures 4, 5, 7 and 8).

Positioned to the right of the date units drum 4 as viewed in Figure 4 and journalled on its sleeve is the month name drum 11 the hub of which is provided with a sleeve-like extension by means of which the month name drum is rigidly connected with the ratchet wheel 12 positioned to the right of the series of indicator drums. To the right of the month name drum and journalled on its sleeve-like extension are arranged in the order mentioned the hundreds, tens, and units drums 13, 14 and 15 which together indicate the number of the year. The year units drum 15 is at its right hand end face shaped to form a pinion 16 (Figures 4, 13, 15 and 17).

The pinion 6 meshes with a planet wheel 17 (Figures 14 and 15) journalled on a ratchet sector 18 (Figures 4, 6 and 12) which in turn is journalled on the spindle 2. The planet wheel 17 meshes on its outer side with gear teeth formed on the inside of the rim of a register wheel 19 (Figures 12 and 13) which is journalled on the sleeve-like extension of the date units drum 4 between the pinion 6 and the ratchet wheel 12.

Parallelly with the spindle 2 and above the series of drums there is fixedly arranged in the frame a spindle 20 on which is journalled a sleeve 21 which at its right hand end, as viewed in Figure 4, carries a control pawl 22 (Figures 4, 6, 12, 13, 18 to 25) adapted to engage a notch 45 in the periphery of the register wheel 19. The control pawl 22 receives its movement through the intermedium of the sleeve 21 from the lever 24 (Figure 7) which is adapted to be actuated by two pins 25, 26 projecting from the ratchet wheel 8 connected to the date tens drum (Figures 7 and 8).

In addition to the control pawl 22, there cooperates with the ratchet sector 18 also a detent 27 (Figures 6, 12, 13, 18 to 25) which is pivotally secured to the outer end of the radial arm 28 keyed to the spindle 2. The ratchet sector 18 is also adapted to be actuated by a detent 29 pivoted in the frame and provided with an arm 30 which can be actuated by the pin 31 on the month ratchet wheel 12.

To the left of the cylinder of drums as viewed in Figure 4 there is keyed to the spindle 2 a radial arm 33 (Figures 5 and 7) which at its outer end is provided with two movable feed pawls 34, 35 of which the upper one 34 is adapted to engage the ratchet wheel 10 of the day name drum and the lower one 35 the ratchet wheels 5 and 8 of the two date indicating drums.

The date drums as well as the drums indicating the names of the week days, the names of the months, and the number of the year are provided with snap springs 39 secured in the frame and adapted to retain the drums in definite positions.

In order to explain the manner of operation of the apparatus it will be assumed initially that the apparatus is set on one of the first days in a month having 31 days, for instance the month of January, and that the turning magnet 3 is connected to a central clock or some corresponding arrangement which sends out one impulse every 24 hours (at twelve o'clock in the night).

On receiving such an impulse the driving magnet 3 turns the spindle 2 one seventh of a revolution counter-clockwise, as viewed in Figures 5 and 7, the arm 33 then turning through the same angle. The spindle 2 together with the arm 33 is then turned back through the same angle by a spring (not shown on the drawings), the feed pawl 34 then advancing the ratchet wheel 10 one seventh of a revolution the feed pawl 35 on the other hand advancing the ratchet wheel 5 only one tenth of a revolution on account of the shape of its periphery. Through the movement of the ratchet wheel 10, the day name drum 9 is turned so that a new day name appears in the aperture of the casing. In turning the ratchet wheel 5 a new unit number of the date appears, and simultaneously the pinion 6 (Figures 14 and 15) is turned one tenth of a revolution said movement being transferred by means of the planet wheel 17 to the register wheel 19.

When the next following impulses are received the movements described are repeated until the unit number 9 of the date has appeared. When after having been actuated by the next impulse the rocking arm 33 is turned back by its spring 5 the feed pawl 35 will advance the date units drum 4 from position 9 to position 0. At the same time the tens drum 7 and thus also the ratchet wheel 8 is turned from position 0 to position 1 by means of the coupling mechanism shown in Figures 9 to 11. In the date units drum 4 is radially disposed a pin 36 which is adapted to be pressed towards the centre against the action of a blade spring 37 a distance sufficient for the pin to engage a notch in the date tens drums 7 (Figure 10). This occurs when the outer end of the pin 36 passes the snap spring 38 secured in the frame. The pin 36 will then take along the date tens drums 7 one tenth of a revolution. At the end of said turning movement the drum 7 receives a further impulse in the same direction, because a snap spring 39 secured in the frame presses against the periphery of the drum which is shaped as a regular octagon thereby forcing the drum 7 to perform one eighth instead of one tenth of a revolution. During the performance of said additional turning movement the pin 36 releases the date tens drum 7 under the influence of the spring 37.

On receipt of the following impulses the calendar will show the date numbers 11 to and inclusive 30 and the corresponding week day names. When the date number 30 is indicated the ratchet wheels 5 and 8 of the date units drum and date tens drum occupy the mutual positions shown in Figure 7a.

As above said and visible in Figure 10 the date tens drum is divided in eight parts. Its front faces (under the aperture) are marked with the figures 1, 2, 3, (blank), 1, 2, 3, (blank) and the drum makes one revolution in two months, a blank face being shown for the dates 1 to 9, the figure 1 for the dates 10 to 19, the figure 2 for the dates 20 to 29, and the figure 3 for the dates 30 and 31 only.

On receipt of the next impulse and the consequent turning of the spindle 2 the shifting from date numeral 30 to 31 (Figures 7 and 7a) is effected in the following manner. On the clockwise restoring movement of the arm 33 the feed pawl 35 would advance the date tens wheel 8 as well as the units wheel 5 if this were not prevented by a pin 40 secured to the side of the wheel 5 near its periphery and immediately adjacent the notch 41 for the date numeral 1. This notch is deeper than the others in the same wheel and somewhat deeper than the two projections 43 in the tens wheel 8, i. e. the points of the latter projections are positioned at a shorter distance from the turning axis than the point of the notch 41. Through the action of the pin 40 the feed pawl 35 will during its return movement be brought to such a position that its extremity passes across the projection 43 of the tens wheel but engages the notch 41 of the units wheel 5, the wheel 5 being then stepped forward to the position shown in Figure 7. When shifting from the date 10 to the date 11, or from the date 20 to the date 21, the projections 43 of the tens wheel have been turned away so that they are out of reach for the feed pawl 35. The latter will then advance only the units wheel.

Upon receipt of an impulse for shifting from the date numeral 31 to the date numeral 1 of the next month (Figure 7b) the feed pawl 35 will engage during the return movement of the spindle 2, only the tens wheel 8 since the notch 44 for the date numeral 2 of the units wheel is deeper than the projection 43 of the tens wheel 5 and since further the periphery of the units wheel between the notches 41 and 44 for the date numerals 1 and 2 is somewhat deeper (has a shorter radius) than the projection 43 (Figure 7a). The tens digit 3 of the date is turned away and a blank face on the tens drum becomes visible in the aperture. The digit 1 of the date remains. This position is shown in Figure 7c. The arm 42 is now positioned under the pin 40.

The driving arrangement for the month drum 11 and its ratchet wheel 12 is shown in Figures 12 and 13 and in the diagrams of Figures 18 to 25. When shifting to a new month the spindle 2 is turned as before one seventh of a revolution (clockwise according to Figure 12). The feed pawl 27 of the arm 28 will then advance the ratchet wheel 12 one step. The wheel 12 is provided with twelve peripheral notches and should therefore be turned only one twelfth of a revolution at a time. The difference is equalized by the feed pawl 27 sliding a sufficient distance along the outer side of the control pawl 22 before engaging the notch. The feed pawl 27 can engage the notch only in case the control pawl 22 is engaging the notch 45 of the register wheel 19. The notches in the periphery of the wheel 12 are of different depths depending upon whether the corresponding month has 28, 30 or 31 days, so that if the depth of the notches 46 (for 31 days) is designated as a unit the notches 47 (for 30 days) have a depth of two units and the notch 48 (for 28 days) a depth of four units. In the periphery of the ratchet sector 18 there are three notches 49, 50 and 51 the distance to the centre of which corresponds to the respective notches in the wheel 12 in the following manner. The bottom of the notch 49 is at the same distance from the centre as the bottom of the notch 47. The botom of the notch 50 is arranged somewhat farther from the centre than the bottom of the notch 48. The notch 50 corresponds to the intercalary day in a manner to be more closely described below. The bottom of the notch 51 is positioned at the same distance from the centre as the bottom of the notch 48 (corresponding to the month of February in an ordinary year, i. e. in a year that is not a leap year). The notches 46 lie so far from the centre that their bottoms will extend outside the portion of the periphery of the sector designated with the numeral 52.

When shifting from the position shown in Figure 12 (31st January in an ordinary year) the control pawl 22 is in engagement with the notch 45 and the feed pawl 27 will therefore engage the notch 48 and also the notch 51. The wheel 12 is thereby stepped forward one twelfth of a revolution. At the same time the ratchet sector 18 is stepped forward the same angle and in addition the further 1/90 of a revolution, which is required in order that it shall be able to advance the register wheel 19 3/30 of a revolution. This is brought about by the planet wheel 17 rolling on the sun-wheel 6, which has the same radius and the same number of teeth as the wheel 17, the wheel 17 thereby driving the toothed rim of the register wheel 19, which has three times as great a radius and three times as many teeth as the wheel 17 (Figure 18). The restoring of the sector 18 to its initial position is prevented by the spring-actuated detent 29. The wheel 6 is locked through the detent 53 (Figure 7) which cooperates with the wheel 5 connected with the units drum.

The month name drum now shows the month of February in the aperture but the date drums still indicate the number 31. In the return movement of the spindle 2 the tens drum is turned as described above and the tens digit 3 disappears. At the same time the arm 24 is lifted by the pin 25 of the ratchet wheel 8, the sleeve 21 being then turned counter-clockwise according to Figure 18 lifting the control pawl 22 so that the latter in turn will lift the feed pawl 27 so high that on the following impulses the latter does no reach any of the notches in the wheel 12 and in the sector 18. On the following dates in the same month only the day name drums and date drums are therefore actuated. On shifting from the date 9 to the date 10 the pin 25 on the ratchet wheel 8 releases the arm 24 (Figure 7). The control pawl 22 would then drop and the feed pawl 27 engage a notch on receipt of the next impulse but for the control pawl being arrested by the periphery of the register wheel 19 along which it will thereafter slide. The feed pawl 27 is consequently still kept inoperative. Since the centre wheel 6 of the planetary gear is rigidly connected with the date drum 4 the wheel 6 is advanced one tenth of a revolution every 24 hours. As mentioned before the ratio of the planetary gear is 1:3 and consequently the register wheel 19 will turn 1/30 of a revolution every 24 hours. Since the register wheel was advanced 3/30 of a revolution already on shifting the date to the 1st of February, 27 days are required for the notch 45 to arrive again directly under the extremity of the control pawl 22. The calendar then indicates the 28th of February (Figure 20). The control pawl 22 now engages the notch 45 under the action of the spring 53' (Figure 12).

On receipt of the next impulse the feed pawl 27 will consequently engage the notch 46 representing the month of March and advance the month drum one twelfth of a revolution so that the name of the month of March will appear in the aperture. During this movement one of the pins 54 on the inside of the ratchet wheel 12 (Figure 21) lifts the arm 30 rigidly connected with the detent 29 so that the latter releases the sector 18. The sector will then under the action of the spring 55 (Figure 6) return to its initial position shown in Figure 12. Since the control pawl 22 is still in engagement with the notch 45 the register wheel 19 is locked against counter-clockwise movement. For this reason the planet wheel 17 will roll against the wheel 19 and drive the wheel 6 3/10 of a revolution counter-clockwise as viewed in Figure 20. The units drum is hereby advanced three days (from the numeral 8 to the numeral 1 in the aperture). Simultaneously herewith the tens drum is also advanced through the intermedium of the coupling mechanism above described (Figures 9 to 11) from the position indicating the numeral 2 to the position indicating the numeral 3. The calendar now indicates the date 31, the indication March appears in the aperture, and the arm 28 is in its advanced position (in its right hand position according to Figures 18 to 25). On the counter-clockwise restoring movement of the arm 28 upon the ceasing of the impulse the tens digit 3 disappears and the control pawl 22 is lifted in the above described manner, whereafter the parts occupy the positions shown in Figure 21. The calendar now indicates the 1st of March.

During the month of March the weekday drum and the date drums are advanced in the manner described above, and the control pawl 22 holds the feed pawl 27 out of reach from the notches of the month ratchet wheel 12 until the date 10 appears, the control pawl then sliding according to the above along the periphery of the register wheel 19. Since on the 1st of March the notch 45 was positioned under the extremity of the control pawl 22 and the wheel 19 is turned 1/30 of a revolution in every 24 hours the notch 45 will on the 31st of March again be positioned directly under the extremity of the control pawl which then engages the notch 45 so that the month drum can be advanced to show a new month. The feed pawl 27 then engages the notch 47 in the ratchet wheel 12 as well as the notch 49 in the sector 18, said two notches having the same depth, and turns the wheel together with the sector clockwise. In this case the sector 18 is advanced only so far that the register wheel 19 is caused by means of the planetary gear to move 1/30 of a revolution. The sector is locked in this position by means of the detent 29 the parts then occupying the position shown in Figure 22. The calendar now indicates the 1st of April.

During the month of April the week day drum and the date drums are advanced as above described. When the date numeral 30 has appeared in the aperture the notch 45 is again positioned directly under the extremity of the control pawl 22, the extremity then engaging the notch. On receipt of the next impulse the feed pawl 27 engages the notch 46 and advances the month ratchet wheel 12 so that the month of May appears in the aperture of the casing. The pin 54 on the wheel 12 lifts the detent 29 out of engagement with the sector 18 by means of the arm 30. The sector 18 then returns to its initial position while turning, by means of the planetary gear, the pinion 6 together with the date drum 4 one tenth of a revolution, so that the date 31 appears in the coming aperture. In the return movement of the arm 28 the tens drum is advanced from position 3 to a position showing a blank surface and simultaneously herewith the control pawl 22 is lifted. The calendar now indicates the 1st of May.

At the moment of shifting from the month of December to the month of January, i. e. to a new year, the month ratchet wheel 12 has turned so far counter-clockwise according to Figure 16 that the toothed wheel 55' is engaged by the pin 56 secured in the frame and is thereby turned clockwise one fourth of a revolution. Hereby the toothed wheel 57, which is arranged on the same shaft as the wheel 55 and is rigidly connected thereto, is turned the wheel 57 in turn advancing the toothed wheel 16 rigidly connected with the units drum 15 of the series of drums indicating the number of the year so that said drum is turned 1/10 of a revolution. The new number of the year now appears.

Arranged on the same shaft as the toothed wheels 55 and 57 and rigidly connected thereto is a cam wheel 59 having such a shape that one fourth of its periphery has a greater radius than the remaining portion thus forming a cam surface 60. The lower portion of the periphery is approximately on a level with the bottom of the notch 48. On every fourth shifting of the year the cam surface 60 will cover part of the notch 48 radially. The entire group of wheels 55, 57 and 59 is retained in the set position by a snap spring 61 which is secured to the ratchet wheel 12 and engages two of the teeth of the wheel 55'.

During a leap year the cam surface 60 covers part of the notch 48 (the driving notch for the month of February), so that when the month drum is advanced to the position of February the feed pawl 27 will be prevented by the cam 60 from reaching the bottom of the notch 48 and will engage the notch 50 in the sector 18 (Figure 24) instead of the notch 51 as in ordinary years. The wheel 19 will then be advanced 2/30 of a revolution instead of 3/30, and the month shifting mechanism will be released first after the date numeral 29 has appeared in the aperture (Figure 25). When shifting to the month of March the sector 18 has in this case to pass a ⅓ shorter way in returning to its initial position, and consequently the sector will drive the wheel 6 by means of the planetary gear only ⅔ of its movement during an ordinary year. Hereby the date will be advanced two days instead of three, and accordingly to the numeral 31 also in this case. Thereafter the same operations as during an ordinary year will be performed.

The advancing of the tens and hundreds digits of the number of the year is effected in the same manner as the advancing of the tens digits of the date except that the drums indicating the number of the year are shaped as decagons.

From the above it will be clear that there exists a reciprocal action between the advancing of the date ratchet wheels and of the register wheel 19 forming the outer wheel in the planetary gear, the date ratchet wheels and the register wheel being locked against rotation in opposite directions so that a movement of the sector 18 in one direction effects an advance of the register wheel 19 and a movement of the sector 18 in the other direction effects an advance of the date wheels.

When shifting to a month having 31 days from a month having a less number of days a double advancing of the date drums is effected, firstly during the advance movement of the arm 28 through the intermedium of the planetary gear, the unit drums being then advanced from 8, or 9, or 0, to 1 secondly during the return movement of the arm 28, the tens drum being then advanced one step, viz. from 3 to 0, whereas the unit drum remains on 1. On all other days the date drums are actuated only at the return movement of the arm 28.

The construction of the mechanism is based on the assumption that in the calendar a month having less than 31 days is both preceded and followed by a month having 31 days, i. e., that two short months do not follow immediately upon each other. This is the case in the Gregorian and the Julian calendars.

The turning magnet for turning the spindle 2 described above and shown on the drawings forms no essential element of the invention but can be replaced by any other suitable electrical or mechanical arrangement capable of giving to the spindle 2 a turning impulse of one seventh of a revolution against the action of a restoring spring. Similarly, the differential or planetary gearing and several details of the mechanism may be made otherwise than shown without receding from the fundamental idea of the invention.

What I claim is:

1. A calendar mechanism comprising a rotatable indicator of dates and a rotatable indicator of names of months, a month shifting mechanism, a source of driving impulses intermittently connected to said indicators, a differential gear having a sun wheel, connected to said indicator of dates, a second sun wheel or register wheel controlling said month shifting mechanism, a planetary wheel determining by its position corresponding positions of said register wheel, and means for moving said planetary wheel at the beginning of every month in a position corresponding to the length of said month, locking the planetary wheel there and releasing it at the end of the month.

2. A calendar mechanism comprising date and month indicator drums journalled on a common oscillating spindle, serving as a source of impulses; a month shifting mechanism; a differential gear, having a sun wheel connected to said date indicator drum, a planetary wheel journalled in a ratchet sector, pivoted around said spindle, and second sun or register wheel, pivoted around said spindle, said register wheel having on its periphery a notch meshing with a control pawl of said month shifting mechanism, said control pawl being inserted between said month indicator drum and a ratchet pawl on said spindle, said control pawl being actuated by a lever, which is arranged in the way of pins on said date indicator drum, said first sun wheel, planetary wheel and second sun or register wheel having a ratio of gearing of 1:1:3.

3. A calendar mechanism comprising date and month indicators journalled on a common driving spindle, a month shifting mechanism and a differential gear inserted between said date indicator and said month shifting mechanism, the date tens wheel and the date units wheel being actuated by a common driving pawl on said spindle, said driving pawl having an arm reaching within the periphery of said date units wheel, said arm being adapted to be lifted at shifting the date from 0 to 1 by means of a pin on said date units wheel, the notch of said date units wheel for date 1 being at a greater distance from the centre than the corresponding notch of the date tens wheel.

4. A calendar mechanism comprising date and month indicators journalled on a common driving spindle, a month shifting mechanism and a differential gear inserted between said date indicator and said month shifting mechanism, the date tens wheel and the date units wheel being actuated by a common driving pawl, the periphery of said date unit wheel between the notches for dates 1 and 2 having smaller radius than the corresponding notch of said date tens wheel.

5. A calendar mechanism comprising date and month indicators journalled on a common driving spindle, a month shifting mechanism and a differential gear inserted between said date indicator and said month shifting mechanism, the date unit drum having a coupling device adapted to once in a revolution of said date units drum actuate said date tens drum a tenth of a revolution, a spring actuating the octagon periphery of said date tens drum and forcing it to complete the movement introduced by said coupling device.

6. A calendar mechanism comprising date, month and year indicators journalled on a common driving spindle, a month shifting mechanism and a differential gear inserted between said date indicator and said month shifting mechanism, a double toothed wheel being journalled on said month indicator, said toothed wheel meshing with a fixed pin and with a toothed wheel on said year indicator and being adapted to drive said year indicator one unit by each engagement.

7. A calendar mechanism comprising date, month and year indicators journalled on a common driving spindle, a month shifting mechanism and a differential gear inserted between said date indicator and said month shifting mechanism, a double toothed wheel being journalled on said month indicator and being adapted to drive said year indicator, said double toothed wheel having a cam fixed thereto, said cam being adapted to partially cover the notch representing the month of February in the ratchet sector of said differential gear, thereby effecting the inserting of a day in the month of February in leap years.

AGNE KNÖS HERBERT GERMUNDSSON.